United States Patent
Mann et al.

(10) Patent No.: US 10,615,744 B2
(45) Date of Patent: Apr. 7, 2020

(54) INTELLIGENT SOLAR CELL CARRIER SYSTEM FOR FLIGHT AND LABORATORY MEASUREMENT APPLICATIONS

(71) Applicant: The Aerospace Corporation, El Segundo, CA (US)

(72) Inventors: Colin J. Mann, Los Angeles, CA (US); Don Walker, Whittier, CA (US); John C. Nocerino, Culver City, CA (US); Justin H. Lee, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 263 days.

(21) Appl. No.: 15/675,772

(22) Filed: Aug. 13, 2017

(65) Prior Publication Data
US 2019/0052225 A1   Feb. 14, 2019

(51) Int. Cl.
*H02S 50/10* (2014.01)
*G01K 7/16* (2006.01)
*G01K 1/14* (2006.01)

(52) U.S. Cl.
CPC ............... *H02S 50/10* (2014.12); *G01K 1/14* (2013.01); *G01K 7/16* (2013.01)

(58) Field of Classification Search
CPC ..... Y02E 10/50; H01L 31/042; H01L 31/048; H01L 31/02021; H01L 31/0445; H02S 50/00; H02S 50/10
USPC .................................. 374/137, 183, 120, 44
See application file for complete search history.

(56) References Cited

U.S. PATENT DOCUMENTS

| | | | | |
|---|---|---|---|---|
| 5,125,983 A * | 6/1992 | Cummings | ........... | H01L 31/048 136/246 |
| 7,977,567 B2 * | 7/2011 | Bett | ...................... | H01L 25/041 136/244 |
| 2008/0135095 A1 * | 6/2008 | Cummings | ......... | H01L 31/0547 136/259 |
| 2009/0272427 A1 * | 11/2009 | Bett | ...................... | H01L 25/041 136/249 |
| 2010/0300509 A1 * | 12/2010 | Raymond | .......... | G01R 31/3025 136/244 |
| 2011/0088744 A1 * | 4/2011 | Xia | ......................... | H02S 50/10 136/244 |
| 2011/0316343 A1 * | 12/2011 | Krauser | ............ | H01L 31/02021 307/77 |

(Continued)

FOREIGN PATENT DOCUMENTS

CN    201887055 U  *  6/2011
CN    202977270 U  *  6/2013
(Continued)

*Primary Examiner* — Gail Kaplan Verbitsky
(74) *Attorney, Agent, or Firm* — LeonardPatel PC

(57) ABSTRACT

An apparatus for carrying, retrieving, and characterizing temperature and current-voltage properties of a solar cell may include a metal core printed circuit board (PCB). The metal core PCB includes current-voltage and temperature measurement electronics operated by a remote device via a communication unit. The solar cell is embedded onto the metal core PCB by way of a thermally- and electrically-conducting adhesive material. The current-voltage and temperature electronics and the solar cell are thermally connected to the PCB, and are electrically isolated from each other, while residing on the same plane.

16 Claims, 7 Drawing Sheets

(56) References Cited

U.S. PATENT DOCUMENTS

| | | | | |
|---|---|---|---|---|
| 2012/0006383 A1* | 1/2012 | Donnelly | ............. | H01L 23/473 |
| | | | | 136/246 |
| 2012/0312351 A1* | 12/2012 | Knox | ................. | H01L 31/0543 |
| | | | | 136/246 |
| 2013/0092216 A1* | 4/2013 | Yan | ....................... | H02S 50/10 |
| | | | | 136/251 |
| 2017/0115167 A1* | 4/2017 | Fujiwara | .................. | G01K 1/14 |
| 2017/0244358 A1* | 8/2017 | Moslehi | ................. | H02S 40/34 |
| 2017/0373207 A1* | 12/2017 | Hwang | ................ | H01L 31/048 |
| 2018/0175789 A1* | 6/2018 | Cherukupalli | .... | H01L 31/02021 |
| 2018/0323333 A1* | 11/2018 | Morad | ................ | H01L 31/0201 |

FOREIGN PATENT DOCUMENTS

| | | | |
|---|---|---|---|
| CN | 103294102 A | * | 9/2013 |
| CN | 105024623 A | * | 11/2015 |

\* cited by examiner

INTELLIGENT SOLAR CELL CARRIER SYSTEM FOR FLIGHT AND LABORATORY MEASUREMENT APPLICATIONS

STATEMENT OF GOVERNMENT INTEREST

This invention was made with government support under contract No. FA8802-14-C-0001 awarded by the Department of the Air Force. The government has certain rights in the invention.

FIELD

The present invention relates to solar cell measurements, and more particularly, to a solar cell measurement system configured to measure properties of a solar cell.

BACKGROUND

The most recent standard solar cell holder for space flight and high-altitude experimentation of solar cells was developed by Near Space Characterization of Advanced Photovoltaics (NSCAP), which is a partnership between Air Force Research Laboratory (AFRL), Naval Research Laboratory (NRL), and National Aeronautics and Space Administration (NASA). The NSCAP solar cell holder is a 2-piece design that include a separate printed circuit board (PCB) connected to a 0.20-inch thick aluminum plate.

Although in use today, the NSCAP holder is not without limitations. Integration of a solar cell sample into this holder is a non-trivial process that includes: (i) a space-qualified silicone adhesive used to mount the cell to the aluminum plate; (ii) electrical connections that are made to a separate PCB, which fits on top of the aluminum plate: (iii) an analog temperature sensor that is mounted in a thermally conductive potting compound to the backside of the aluminum plate and is also electrically connected to the PCB; and (iv) the solar cell and temperature leads are connected to a costly, custom electrical connector that interfaces with an external source measurement unit (SMU).

A typical external SMU is a Keithley 2425, which is a bulky and heavy laboratory-grade instrument. The bulky footprint of this combined high altitude solar cell instrumentation package limits solar cell measurement opportunities to an expensive, high altitude balloon or aircraft programs such as government sanctioned balloon flights, NASA Learjet or ER-2 aircraft. Although the Learjet or ER-2 aircraft may fly on an approximate annual basis, only a small area is set aside for hosted experiments on these aircraft. Therefore, only a small number of samples can be flown per flight, further adding to the cost. A high-altitude balloon using the NSCAP package may fly more solar cell samples than the high-altitude aircraft, but the total weight does not decrease, again limiting the number of flights and driving up cost. A common cost estimate for flying a NSCAP balloon is approximately $1M to 2M.

Balloon-flown solar cell calibration standards do not exist following the last JPL campaign in 2005, which is direct evidence for the lack of flights. A similar lull in activity applies for the international institution Centre National D'Etudes Spatiales (CNES), which also flies balloons for solar cell calibration. CNES plans to fly a (heavy) high altitude balloon that includes custom current-voltage electronics and temperature control. CNES claims that this balloon will fly more than 50 solar cells. However, the cost of the campaign will be the equivalent to approximately $1M US dollars, and it is unknown if it will fly again after this flight.

As mentioned above, the Learjet and ER-2 fly approximately once a year, and oftentimes, only one of the aircraft will fly. The last ER-2 flight was May 2016 and the Learjet has not flown in almost two years. Two companies—BlackSky Aerospace Systems, LLC and Angstrom Designs Inc.—have developed inexpensive balloon platforms with flight operating cost approximately a tenth of the cost of operating the JPL or CNES balloon. These two companies, however, have not yet proven reaching altitudes greater than 100,000 feet and have not demonstrated the ability to perform accurate measurements.

The NSCAP holder also presents technical limitations that remain to be quantified. A thermal gradient between the solar cell, silicon adhesive, aluminum plate, and potting compound of the temperature sensor presents a challenge on precise measurement of the solar cell temperature. The NSCAP partnership has not demonstrated whether the temperature sensor configuration enables accurate measurement of the solar cell temperature. Furthermore, the temperature sensor outputs an analog current that must be converted to a digital voltage value. The conversion of values from analog to digital differs for different external SMUs and introduces variable amounts of error.

Thus, an alternative solar cell measurement unit may be beneficial.

SUMMARY

Certain embodiments of the present invention may provide solutions to the problems and needs in the art that have not yet been fully identified, appreciated, or solved by current solar cell measurement systems. For example, certain embodiments of the present invention generally pertain to a solar cell measurement system that includes current-voltage measurement electronics and may be operated remotely by a device, such as a smart phone and a software application, by way of Bluetooth technology.

In an embodiment, an apparatus includes a metal core PCB configured to provide temperature measurements of one or more solar cells. The metal core PCB includes a plurality of layers formed on top of a substrate. The plurality of layers includes at least two dielectric layers and at least two copper layers. The apparatus includes a temperature sensor and the one or more solar cells that are placed on top of one of the at least two copper layers, such that the temperature sensor and the one or more solar cells are electrically isolated from each other.

In another embodiment, an apparatus for carrying, retrieving, and characterizing temperature and current-voltage properties of a solar cell includes a metal core PCB comprising current-voltage and temperature electronics operated by a remote device via a communication unit. The apparatus also includes the solar cell, which is embedded onto the metal core PCB by way of a thermally- and electrically-conductive adhesive material. The current-voltage and temperature electronics and the solar cell are thermally connected to the PCB, while being electrically isolated from each other, but reside on the same plane of the PCB.

In yet another embodiment, a solar cell measurement system may include a metal core PCB embedded with integrated circuits and is remotely controlled by a remote device, allowing for temperature measurements and current-voltage measurements of a solar cell. The solar cell is embedded onto the metal core PCB by way of a thermallyand electrically-conductive adhesive material, and a temperature sensor embedded on the metal core PCB is electrically isolated from the solar cell while remaining on a same plane.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to an intelligent solar cell carrier ($iSC^2$) system for carrying, retrieving, and characterizing temperature and current-voltage properties of a solar cell. The $iSC^2$ system may be referred to as a solar cell measurement system for purposes of explanation and simplicity. The solar cell measurement system is a low cost measurement device, and in some embodiments, is approximately 2"H×3"L×0.0625" W. The solar cell measurement system may include a metal core PCB, integrated circuits (IC), and a computer program (or software) that enables accurate and precise temperature and current-voltage measurements of solar cells in any environment such as space, near space, or ground without the need for a full laboratory setup. Specifically, the solar cell measurement system allows for measurement of solar cell properties without the need for an expensive source measurement unit and custom software. Depending on the embodiment, the solar cell measurement system may interface with a personal computer (PC), smart phones, or tablet via Bluetooth low energy (BLE) technology and an included software application.

Figure 1:
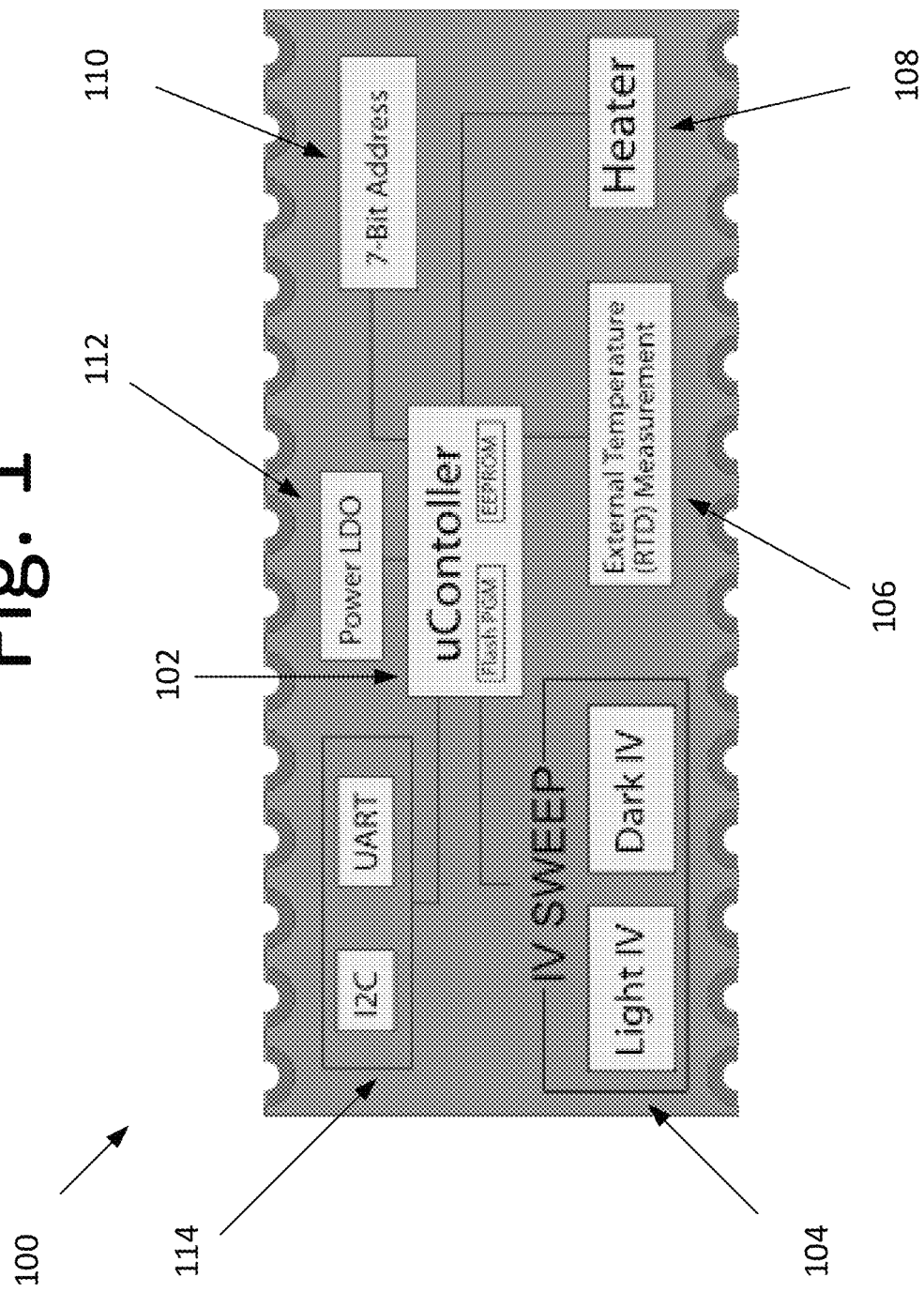
FIG. 1 illustrates a measurement unit as a component of the solar cell measurement system, according to an embodiment of the present invention.

FIG. 1 illustrates a measurement unit 100 as a component of the solar cell measurement system, according to an embodiment of the present invention. In some embodiments, measurement unit 100 is a System in Package (SIP) device, which include electronics that are necessary for all measurements (e.g., current-voltage and temperature measurements), heater control, remote communication, and data storage. The modules listed below are meant to be used in conjunction with the measurement unit for various applications.

Measurement unit 100 may include measurement and control electronics used by one or more modules within the solar cell measurement system. A microcontroller (or "μController") 102 may control IV sweep electronics 104, temperature measurement electronics (or external temperature (RTD) measurement) 106, heater control electronics (or heater) 108, and an embedded memory (e.g., EEPROM) 110 for storing calibration data.

Measurement unit 100 may include a bus 114. For example, measurement unit 100 may address selection pins for daisy chaining devices using the $I^2C$ bus, for example. This may allow for up to 128 devices on a bus. In an alternative embodiment, measurement unit 100 may use an UART communication bus. In addition, power regulation electronics 112 provide remote enable/disable, short circuit protection, and a single 5V-12V power rail.

Current Voltage Measurement

In some embodiments, measurement unit 100 may perform current-voltage (I-V) measurements under light as well as in the dark. For dark I-V measurements, a forward biased source voltage is supplied from the main power rail of power source 112. This forward biased source voltage can be enabled or disabled by measurement unit 100 depending on the type of measurement being made. During the measurement, regardless of the conditions, a load is applied to the solar cell (not shown) by sweeping a MOSFET in the linear mode. This load is determined by a voltage set by measurement unit 100, and gradually stepped through the range of values between short circuit current and open circuit voltage. An optimized algorithm may determine the step points depending on the cell characteristics.

The measurement resolution in certain embodiments is partially determined by the minimum and maximum values of the measured solar cell. However, the analog digital converter (ADC) may be a 24-bit module that makes full 4-wire measurements of the device under test (DUT).

Temperature Measurement

Measurement unit 100 may include electronics, such as temperature measurement electronics 106, necessary to perform a 4-wire measurement on a temperature sensor (not shown) requiring a current source. This can be an RTD, a diode sensor, or any sensor that varies its resistance with temperature. Measurement unit 100 may also include internal temperature sensors on both microcontroller 102 and the ADC to provide temperature compensated conversions. The accuracy of the temperature measurement is dependent on the sensor, and is capable of ±0.1° C. accuracy with a resolution of 0.001° C. in some embodiments.

Standard Solar Cell Measurement System

Figure 2:
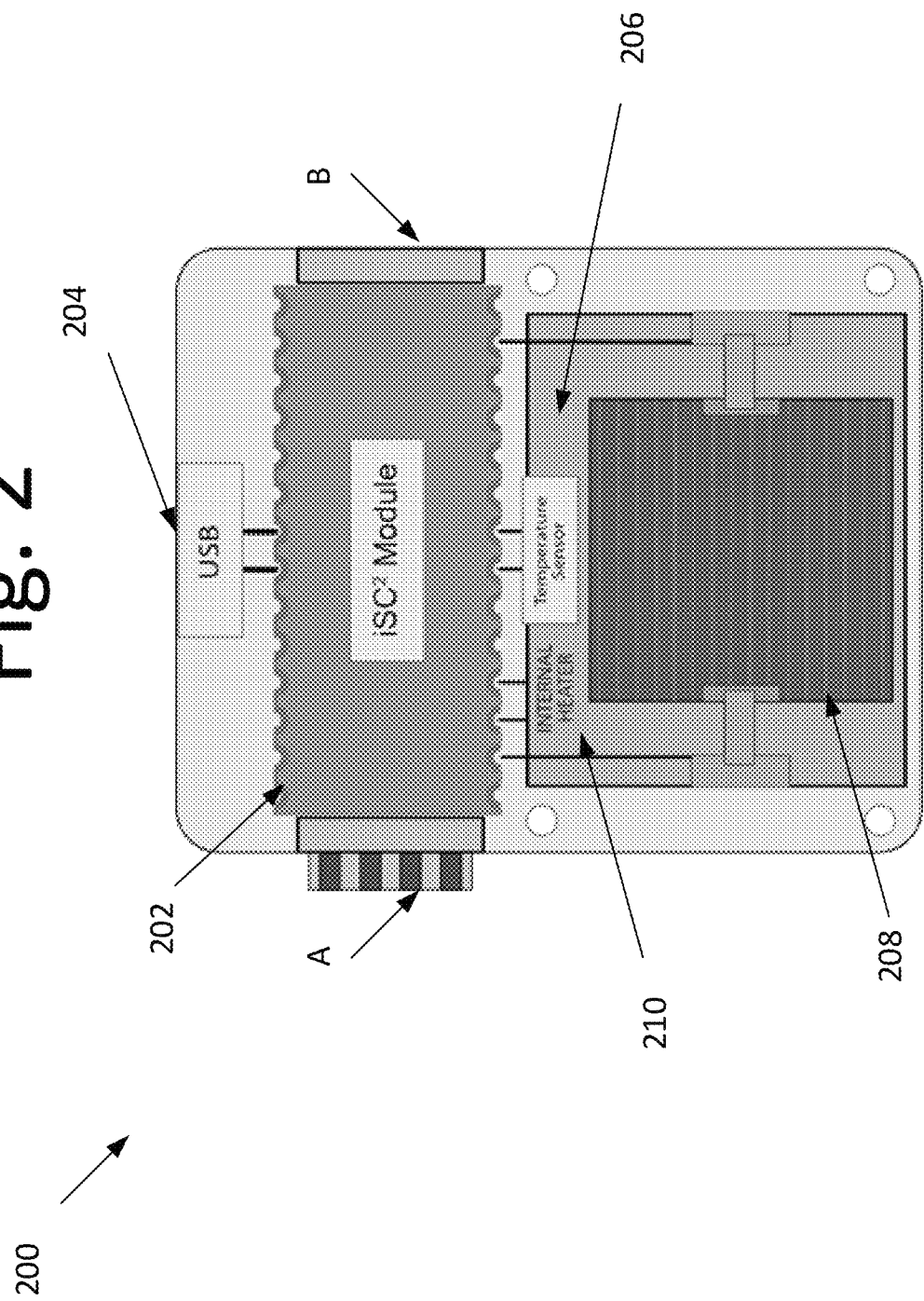
FIG. 2 illustrates a solar cell measurement system, according to an embodiment of the present invention.

FIG. 2 illustrates a solar cell measurement system 200, according to an embodiment of the present invention. In this embodiment, solar cell measurement system 200 incorporates measurement unit 202, along with a USB 204 interface for communicating with a remote host such as a computer, smart device, tablet, etc. Measurement unit 202 is made using metal core PCB technology. The metal core PCB has high thermal conductivity dielectric between the backplane and the top copper layer, and is painted with high reflectance white paint. See, for example, FIG. 7, which discusses the metal core PCB and stack up of the layers of the metal core PCB in more detail.

A temperature sensor 206 is mounted near solar cell 208, providing very small thermal gradients between solar cell 208 and temperature sensor 206. In addition, an embedded heater circuit 210 is built into the PCB below solar cell 208, which can be controlled via solar cell measurement system 200. Heater 210 may be resized to provide varying heating capability depending on the application.

Connectors A and B are matching male (A) and female (B) connectors, allowing for daisy-chaining of modules together. Connectors A and B share the same power rails, enable, and communication pins. When connected, the modules may communicate with a host computer device using a single USB connection.

Solar Cell Measurement System with BLE Module

Figure 3:
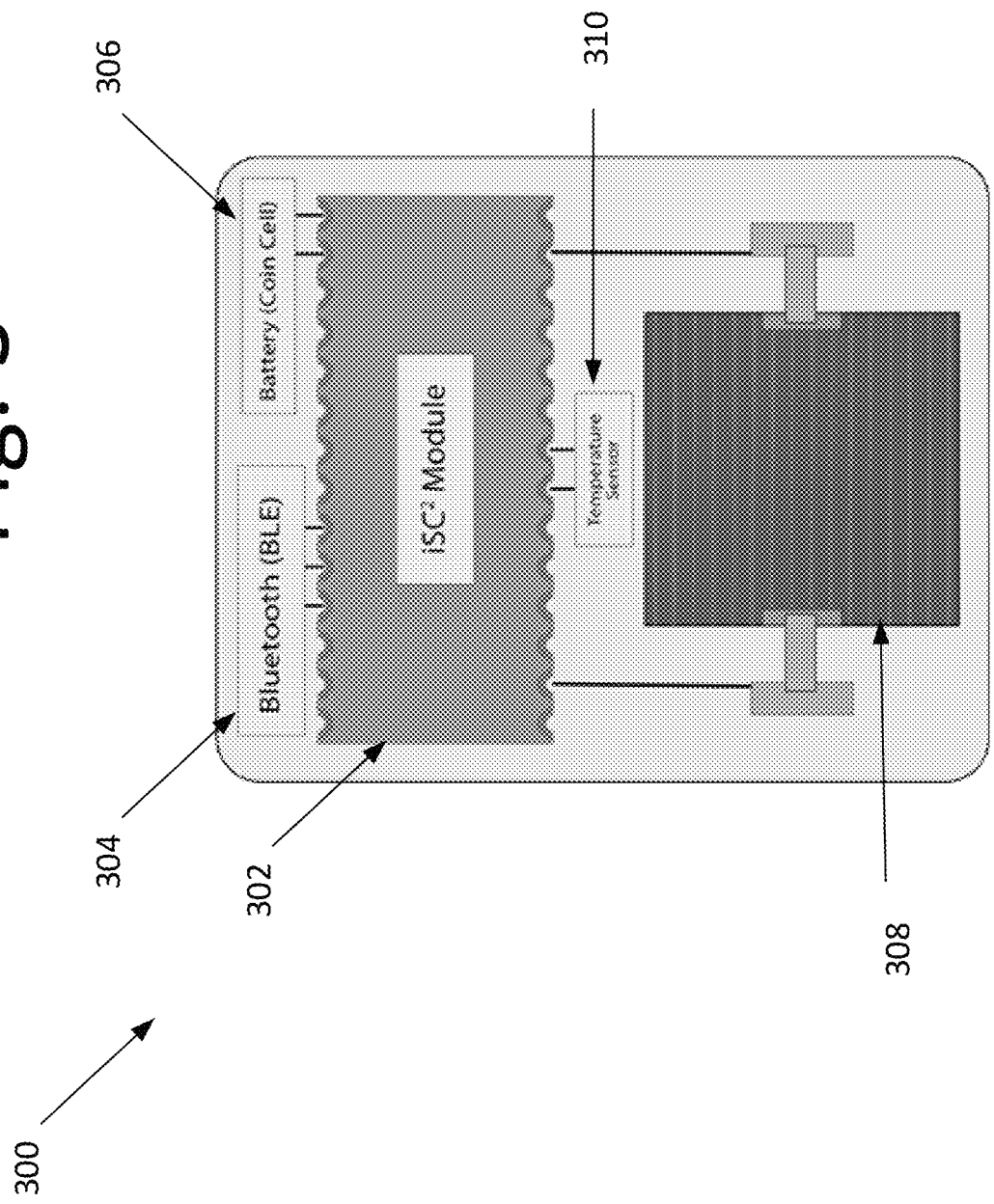
FIG. 3 illustrates a solar cell measurement system with a BLE module, according to an embodiment of the present invention.

FIG. 3 illustrates a solar cell measurement system 300 with a BLE module 304, according to an embodiment of the present invention. In this embodiment, solar cell measurement system 300 functions and operates similar to the solar cell measurement system 200 of FIG. 2 in terms of metal core PCB construction. However, BLE module 304 does not contain a USB connection. Instead, BLE module 304 is powered by a power source 306, such as a coin cell battery in some embodiments, and communicates with a host device, such as a computer, tablet, cell phone, etc., using the BLE protocol. The features discussed above in FIG. 2 may also be incorporated in the solar cell measurement unit 300, and may further include remote accessibility. In certain embodiments, a solar cell 308 is mounted on solar cell measurement system 300, and may store data within measurement unit 302 and additionally on a BLE communication device via BLE module 304.

In some embodiments, temperature sensor 310 of FIG. 3 and temperature sensor 206 of FIG. 2 are 4-wire measurements of a remote sensor (RTD in certain embodiments).

Standard Solar Cell Measurement System with a Remote Module

Figure 4:
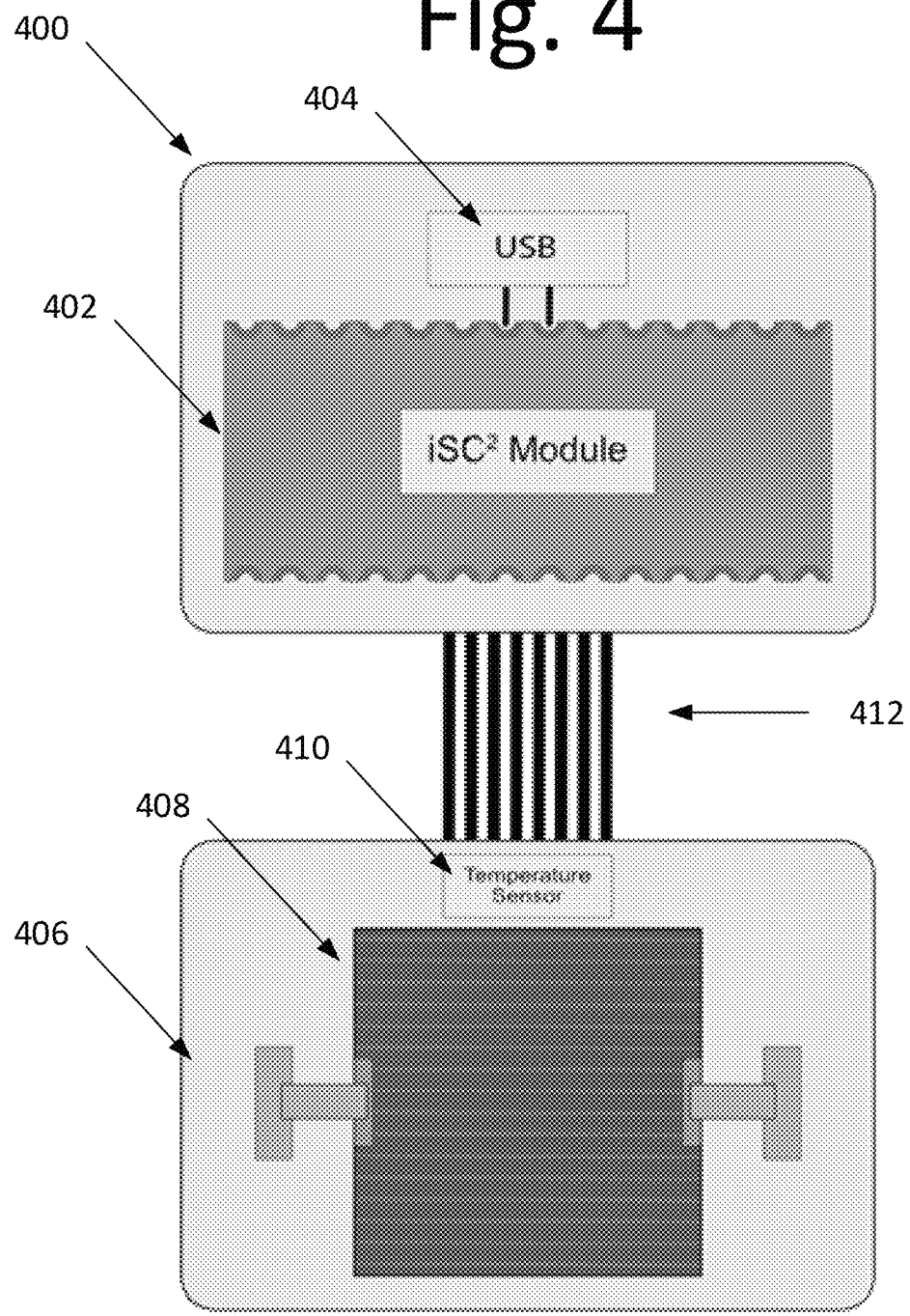
FIG. 4 illustrates a solar cell measurement unit with a remote module, according to an embodiment of the present invention.

FIG. 4 illustrates a solar cell measurement unit 400 with a remote module 406, according to an embodiment of the present invention. In this embodiment, remote module 406 may remove the measurement and control electronics found, as shown in FIG. 1 for example, to a remote location. For example, remote module 406 may include solar cell 408 and temperature sensor 410. Solar cell 408 and temperature sensor 410 may operate and/or function in a similar manner as discussed above in FIGS. 2 and 3. With this embodiment, measurement unit 402 may perform 4 wire measurements on remote module 406 via connectors 412. In some embodiments, connectors 412 may be a ribbon cable of any type containing at least 10 wires, 2 4-wire measurements, one for temperature sensor 410 and one for solar cell 408, and two additional wires for heater control. By using 4-wire measurements, cable length is not an issue in measurement accuracy. Furthermore, the heater (not shown) can still be controlled remotely as well.

The benefit of the remote measurement embodiment, as shown in FIG. 4, is that a smaller footprint is needed facing the sun. In most uses, space is limited for mounting sun facing samples. By moving the measurement electronics 400 behind cell carrier 406, more samples may be placed on the same footprint.

Standard Solar Cell Measurement System with Daisy Chaining Modules

Figure 5:
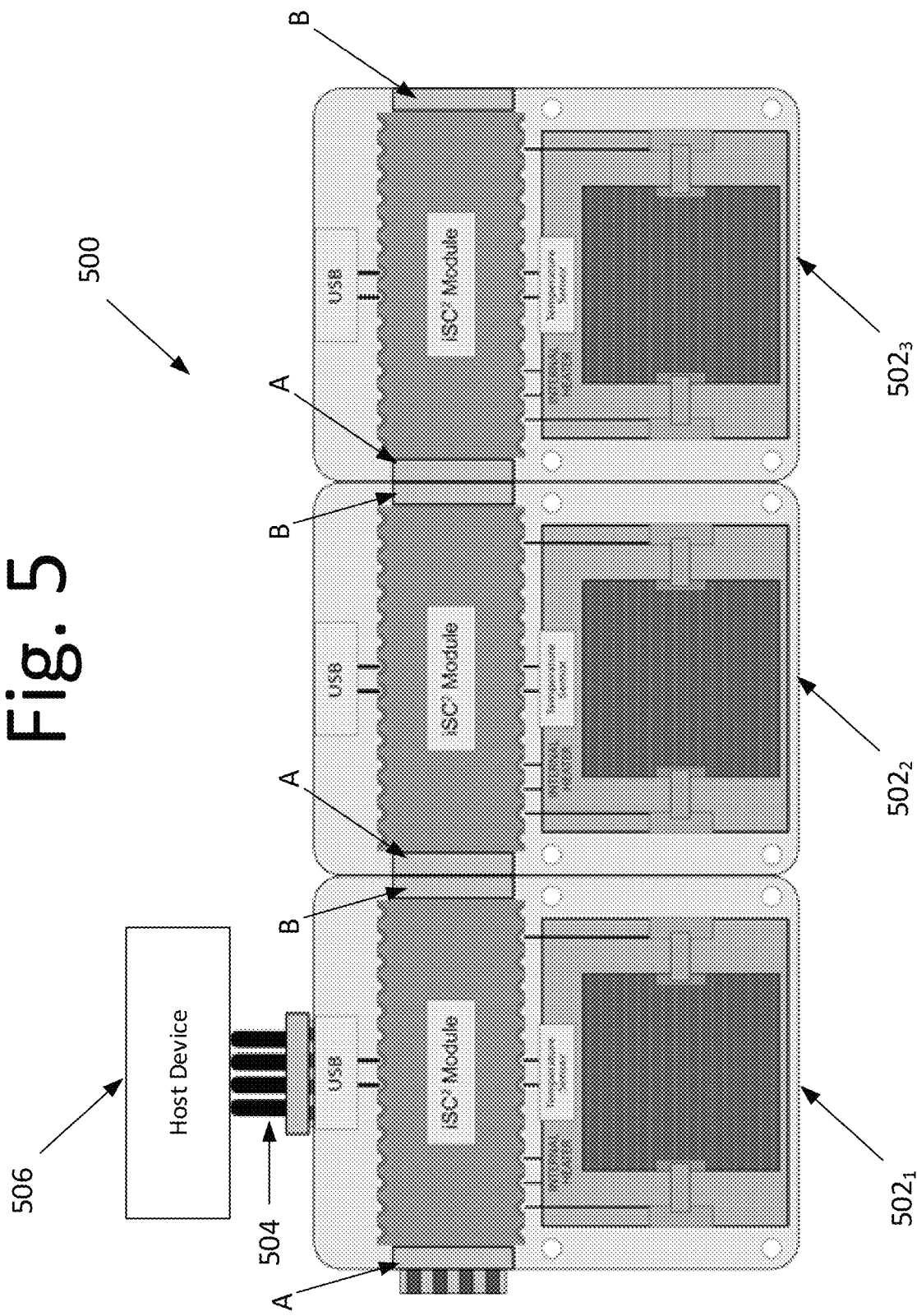
FIG. 5 illustrates a daisy chained solar cell measurement system, according to an embodiment of the present invention.

FIG. 5 illustrates a daisy chained solar cell measurement system 500, according to an embodiment of the present invention. Although FIG. 5 shows a system 500 composed of three solar cell measurement system $502_1$ to $502_3$ daisy chained together, a person of ordinary skill in the art would readily appreciate that any number of solar cell measurement systems may be daisy chained together.

In some embodiments, each solar cell measurement system $502_{1-3}$ includes a connector A and connector B configured to connect one solar cell measurement system to another. By daisy chaining each solar cell measurement system $502_{1-3}$, simultaneous measurements of samples may be accomplished while utilizing a single connection to a remote host 506 via connector 504. In some embodiments, connector 504 may be a universal serial bus (USB) 4-wire cable. This configuration is useful when simultaneous data is required. For example, this embodiment may be utilized when measuring the uniformity of a light source with a matrix of cells connected.

Baffles

Figure 6:
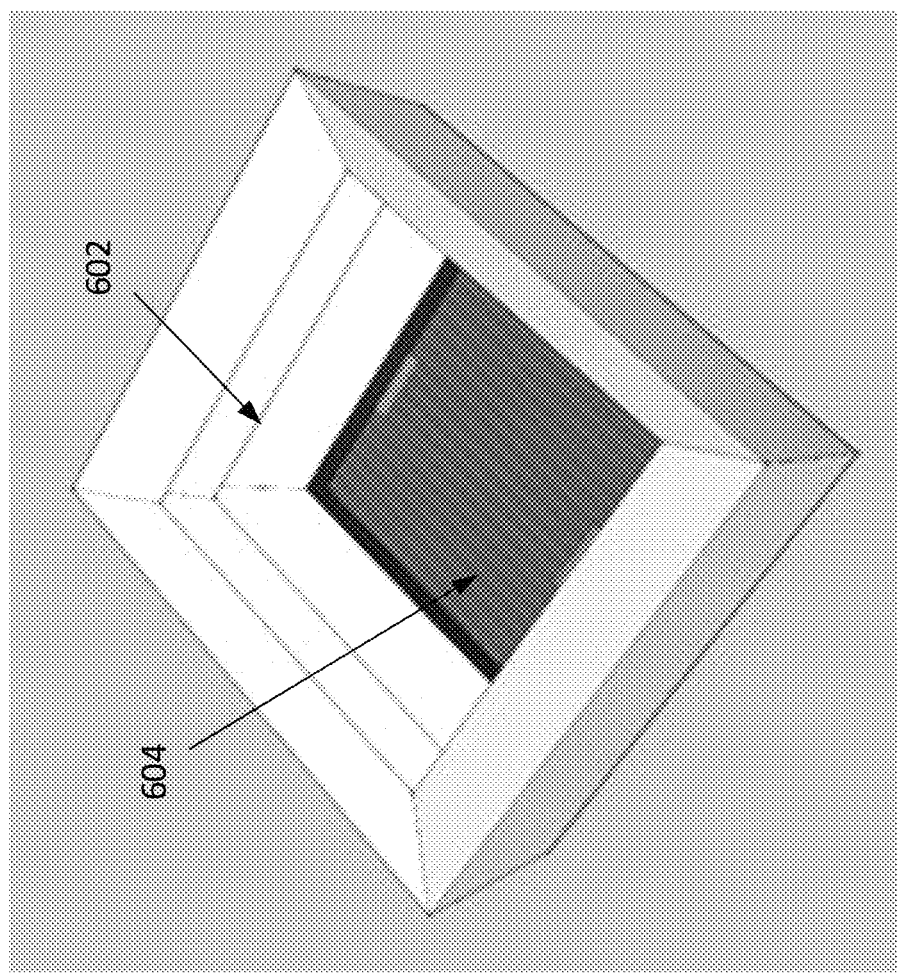
FIG. 6 illustrates a baffle that may limit stray light to all or part of a solar cell, according to an embodiment of the present invention.

FIG. 6 illustrates a baffle 600 that may limit stray light to all or part of a solar cell, according to an embodiment of the present invention. To address the issue of light reflectance on solar cell measurements, baffle 600 has been designed to be incorporated into the solar cell measurement systems shown in FIGS. 1-5. For example, baffle 600 may be attached to the solar cell measurement system, and placed directly, or partially, over solar cell 602. Baffle 600 in some embodiments is secured using a tension fit or screws from the back of the PCB module.

Baffle 600 may incorporate multiple light blocking structures 602 that limit the angle of incidence on solar cell 604 to 5 degrees. It should be appreciated that the angle of incidence may depend based on design choice. In other words, the angle of incidence is not limited to 5 degrees.

Metal Core PCB

Figure 7:
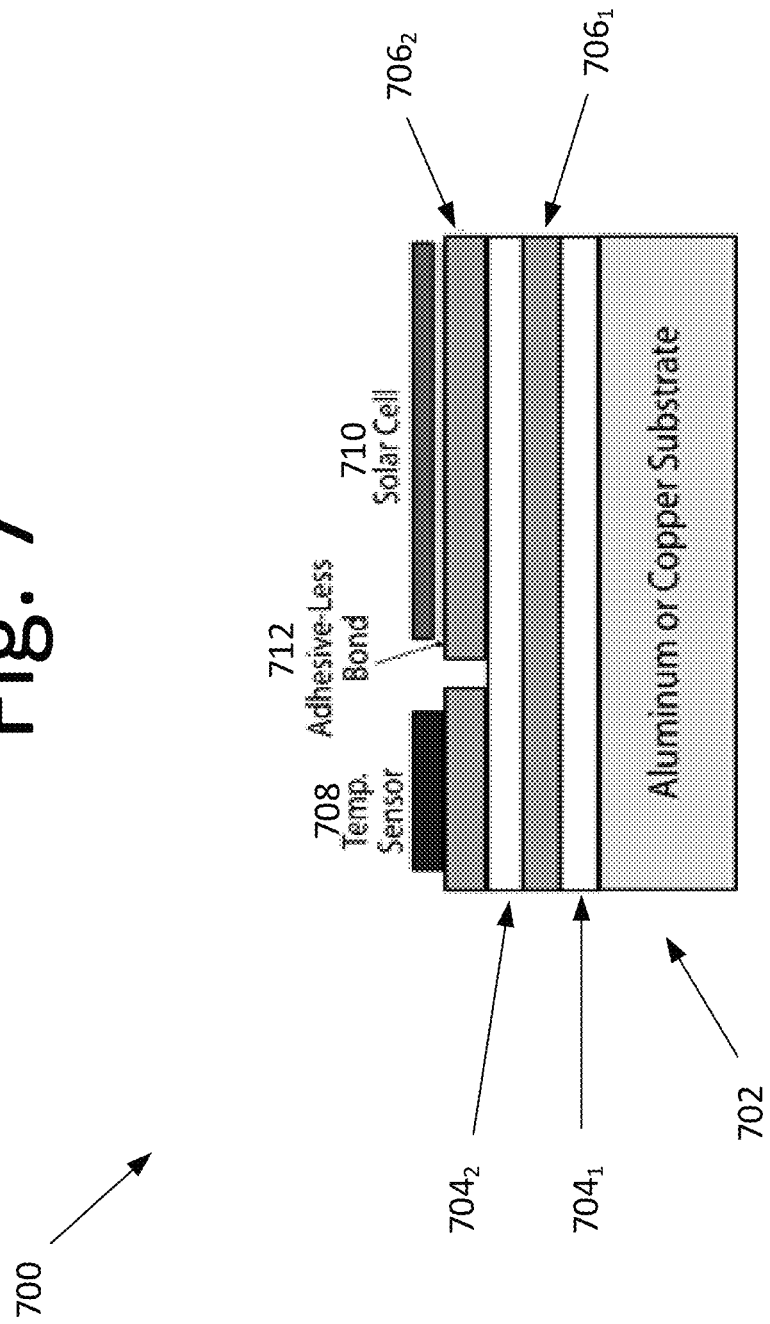
FIG. 7 illustrates a PCB stack for the solar cell measurement system, according to an embodiment of the present invention.

FIG. 7 illustrates a PCB stack 700 for the solar cell measurement system, according to an embodiment of the present invention. In this embodiment, PCB stack 700 utilizes a metal core PCB, providing accurate temperature measurements of the solar cells. The metal core PCB includes a plurality of layers formed on top of aluminum or copper substrate 702. For example, a first (thermally conductive/electrically insulating) dielectric layer $704_1$ is placed on top of substrate 702. Sandwiched between dielectric layers $704_1$, $704_2$ is a copper layer $706_1$. Another copper layer $706_2$ is placed on top of dielectric layer $704_2$. This configuration allows for electrical isolation of temperature sensor(s) 708 from solar cell 710 that is being measured. The thermally conductive dielectric allows low error temperature measurements of solar cell 710 using sensor 708.

In some embodiments, temperature sensor 708 is placed on top of copper layer $706_2$ and is electrically isolated from solar cell 710. This way, both a current-voltage sweep and temperature measurement can be performed. This configuration may be necessary because as a solar cell 710 is being measured, solar cell 710 produces power by converting sunlight to electricity. If solar cell 710, which is producing power, is electrically connected to temperature sensor 708, temperature sensor's 708 temperature measurement can be affected.

In some embodiments, an adhesive-less bond 712 is used to attach solar cell 710 to copper layer $706_2$. For example, because the thermally-conducting dielectric is electrically-insulating, solar cell 710 may be mounted to metal core PCB 700 by solder or adhered via electrically- and thermally-conducting epoxies, silicones, or pastes (e.g., adhesive-less bond 712).

Currently, most solar cells are mounted using silicone, which provides electrical isolation but limits thermal conductivity. The improved thermal conductivity and electrical isolation of the temperature sensor and solar cell as shown in FIG. 7 enables accurate temperature measurements of the solar cell. In certain embodiments, a direct thermal path is made between the solar cell, the solder/thermal adhesive, Copper top layer, thermal dielectric, copper layer, solder, and temperature sensor. The most thermally-resistive material in the thermal path is the thermal dielectric at 4 W/m-K, for example. Further, all the other materials may have thermal conductivities near 100 W/m-K. Embodiments described herein may use an adhesive to mount the solar cell to a substrate with thermal conductivities near 0.2 W/K, making the solar cell measurement system 20 times more thermally-conductive and ultimately enabling a more accurate measurement of the solar cell's temperature.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for carrying, retrieving, and characterizing temperature and current-voltage properties of a solar cell, comprising:
   a metal core printed circuit board (PCB) comprising current-voltage electronics and temperature electronics operated by a remote device via a communication unit, wherein
   the solar cell is embedded onto the metal core PCB by way of a thermally- and electrically-conducting adhesive material, and
   the current-voltage electronics and temperature electronics and the solar cell are thermally connected to the PCB, and are electrically isolated from each other, while residing on a same plane.

2. The apparatus of claim 1, wherein the PCB is painted with high reflectance white paint.

3. The apparatus of claim 1, wherein the current-voltage electronics and temperature electronics is mounted near the solar cell to provide small thermal gradients between the solar cell and the current-voltage and temperature electronics.

4. The apparatus of claim 1, further comprising:
   a heater built into the PCB and is located below the solar cell, wherein the heater is configured to capture heat from the solar cell.

5. The apparatus of claim 1, further comprising:
   a pair of connectors one each side of the apparatus to daisy chain additional apparatuses in succession.

6. The apparatus of claim 1, wherein the communication unit comprises a universal serial bus (USB) connector or a BLE device.

7. The apparatus of claim 1, further comprising:
   a baffle attached to the apparatus, and placed directly or partially over the one or more solar cells, wherein the baffle is configured to limit angle of incidence on the solar cell to a predefined degree.

8. The apparatus of claim 7, wherein the baffle comprises one or more light blocking structures limiting the angle of incidence on the one or more solar cells to a predefined degree.

9. A solar cell measurement system, comprising:
   a metal core printed circuit board (PCB) embedded with integrated circuits and is remotely controlled by a remote device, allowing for temperature measurements and current-voltage measurements of a solar cell, wherein
   the solar cell embedded onto the metal core PCB by way of a thermally- and electrically-conducting adhesive material, and
   a temperature sensor embedded on the metal core PCB is electrically isolated from the solar cell while remaining on a same plane as that of the solar cell, and is configured to measure temperature of the solar cell.

10. The solar cell measurement system of claim 9, wherein the PCB is painted with high reflectance white paint.

11. The solar cell measurement system of claim 9, wherein the temperature sensor is mounted near the solar cell to provide small thermal gradients between the solar cell and the current-voltage and temperature electronics.

12. The solar cell measurement system of claim 9, further comprising:
   a heater built into the PCB and is located below the solar cell, wherein the heater is configured to capture heat from the solar cell.

13. The solar cell measurement system of claim 9, further comprising:
- a pair of connectors one each side of the PCB to enable one or more additional solar cell measurement systems to connect with the solar cell measurement system, creating a daisy chain of additional solar cell measurement systems in succession.

14. The solar cell measurement system of claim 9, further comprising:
- a communication unit comprising a universal serial bus (USB) connector or a BLE device configured to communicate with the remote device.

15. The solar cell measurement system of claim 9, further comprising:
- a baffle attached to the solar cell measurement system, and placed directly above or partially over the solar cell, wherein the baffle is configured to limit angle of incidence on the solar cell to a predefined degree.

16. The solar cell measurement system of claim 15, wherein the baffle comprises one or more light blocking structures to limiting the angle of incidence on the solar cell to the predefined degree.

\* \* \* \* \*